United States Patent
Chen et al.

(10) Patent No.: US 8,238,084 B2
(45) Date of Patent: Aug. 7, 2012

(54) NOTEBOOK COMPUTER

(75) Inventors: Xiao-Zhu Chen, Shenzhen (CN); Lei Liu, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 201 days.

(21) Appl. No.: 12/753,126

(22) Filed: Apr. 2, 2010

(65) Prior Publication Data

US 2011/0157804 A1  Jun. 30, 2011

(30) Foreign Application Priority Data

Dec. 31, 2009 (CN) .......................... 2009 1 0312952

(51) Int. Cl.
*G06F 1/16* (2006.01)
(52) U.S. Cl. ................................. 361/679.14
(58) Field of Classification Search ............. 361/679.14, 361/679.08, 679.55, 679.33
See application file for complete search history.

(56) References Cited

U.S. PATENT DOCUMENTS

| | | | | |
|---|---|---|---|---|
| 5,341,154 A * | 8/1994 | Bird | ............................. | 345/167 |
| 5,586,002 A * | 12/1996 | Notarianni | ............... | 361/679.26 |
| 5,774,331 A * | 6/1998 | Sach | ........................ | 361/679.55 |
| 6,266,234 B1 * | 7/2001 | Leman | ..................... | 361/679.11 |
| 6,307,745 B1 * | 10/2001 | Liebenow | ................ | 361/679.55 |
| 6,369,798 B1 * | 4/2002 | Yatsu et al. | .................... | 345/167 |
| 6,445,579 B1 * | 9/2002 | Singleton, Jr. | ............. | 361/679.4 |
| 6,476,795 B1 * | 11/2002 | Derocher et al. | ............. | 345/163 |
| 6,538,880 B1 * | 3/2003 | Kamijo et al. | ............. | 361/679.4 |
| 6,697,251 B1 * | 2/2004 | Aisenberg | ................ | 361/679.09 |
| 6,707,664 B2 * | 3/2004 | Murphy | ................... | 361/679.16 |
| 6,757,159 B2 * | 6/2004 | Zarek et al. | ............. | 361/679.09 |
| 6,781,823 B1 * | 8/2004 | Nyack | ...................... | 361/679.29 |
| 7,251,132 B1 * | 7/2007 | Paul et al. | ................ | 361/679.33 |
| 7,280,351 B2 * | 10/2007 | Rankins et al. | .......... | 361/679.55 |
| 7,330,923 B2 * | 2/2008 | Wenstrand et al. | ........... | 710/303 |
| 7,440,269 B2 * | 10/2008 | Liao et al. | ................ | 361/679.55 |
| 7,654,459 B2 * | 2/2010 | Orsley et al. | .................. | 235/427 |
| 7,679,897 B2 * | 3/2010 | Xu et al. | ................... | 361/679.37 |
| 2002/0027771 A1 * | 3/2002 | Dong | ............................ | 361/685 |
| 2002/0126441 A1 * | 9/2002 | Kuo et al. | ..................... | 361/680 |
| 2004/0080899 A1 * | 4/2004 | Hill et al. | ...................... | 361/680 |
| 2007/0076379 A1 * | 4/2007 | Hong et al. | ................... | 361/728 |

* cited by examiner

*Primary Examiner* — Lisa Lea Edmonds

(74) *Attorney, Agent, or Firm* — Altis Law Group, Inc.

(57) ABSTRACT

A notebook computer includes an main body defining a receiving groove therein, an auxiliary keyboard slidably accommodated in the receiving groove and electrically connected to the input part, and a cover pivotally connected to one side of the opening and configured for covering the opening when the auxiliary is received in the receiving groove. The auxiliary keyboard includes a number of auxiliary numeric keys arranged in rows and columns for inputting the numbers.

20 Claims, 8 Drawing Sheets

NOTEBOOK COMPUTER

BACKGROUND

1. Technical Field

The present disclosure relates to notebook computers and, particularly, to a notebook computer with a hidden numeric keyboard.

2. Description of Related Art

Generally, in order to reduce the size of a notebook computer, only one keyboard is normally equipped for it, and the separate numeric keypad is often omitted. The keyboard usually includes a number of numeric keys arranged in a line along the length of the notebook computer configured for inputting numbers. However, in some situations, there is a need to frequently input numbers, it is inconvenient and very time-consuming to input the numbers through the numeric keys of the keyboard. As such, the work efficiency of inputting numbers will be less than satisfactory.

Therefore, it is desirable to provide a notebook computer which can overcome the above-mentioned problems.

BRIEF DESCRIPTION OF THE FIGURES

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

Embodiments of the present disclosure will now be described in detail below, with reference to the accompanying drawings.

Figure 1:
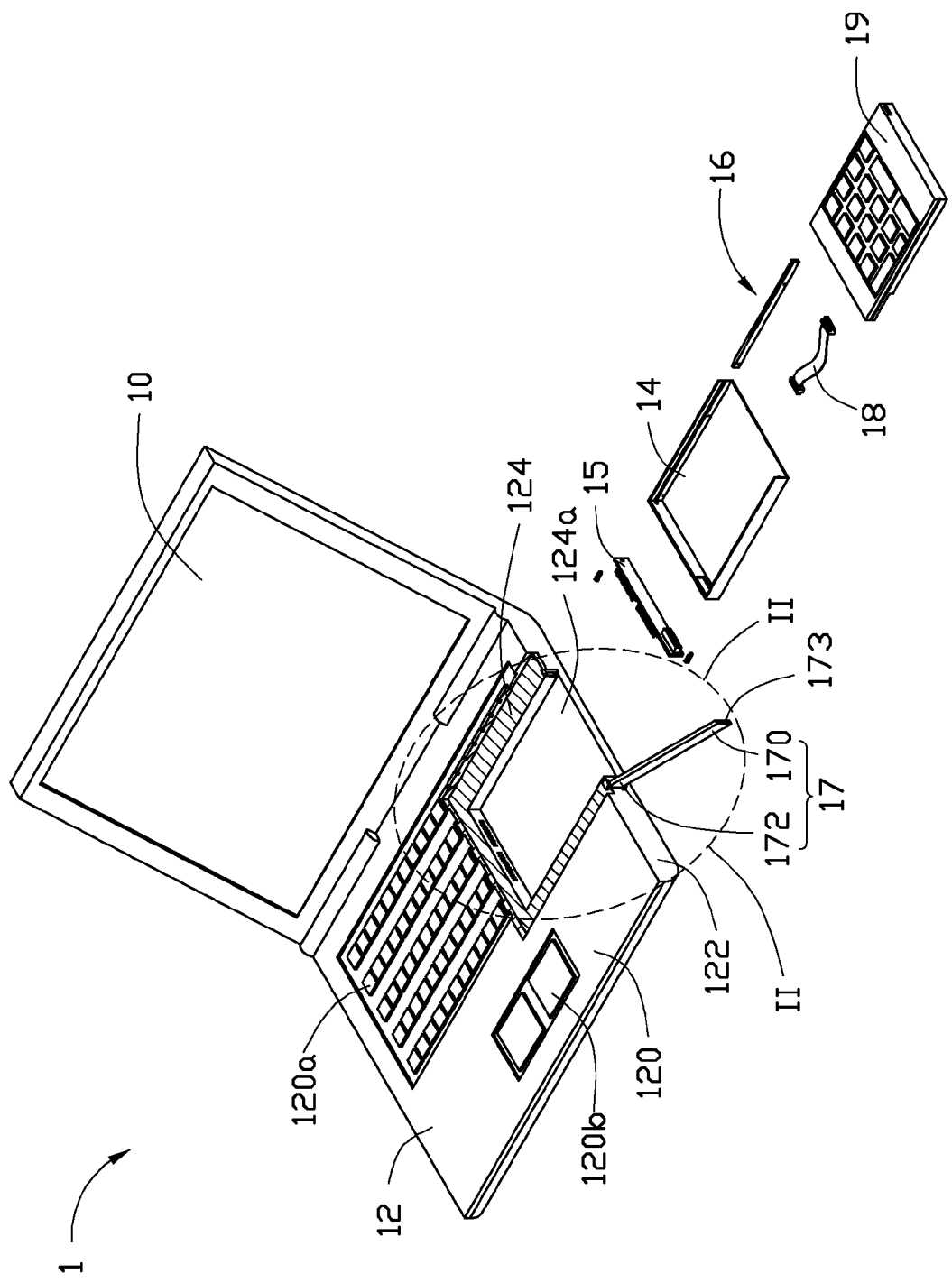
FIG. 1 is an exploded, isometric view of a notebook computer according to one embodiment.
Figure 2:
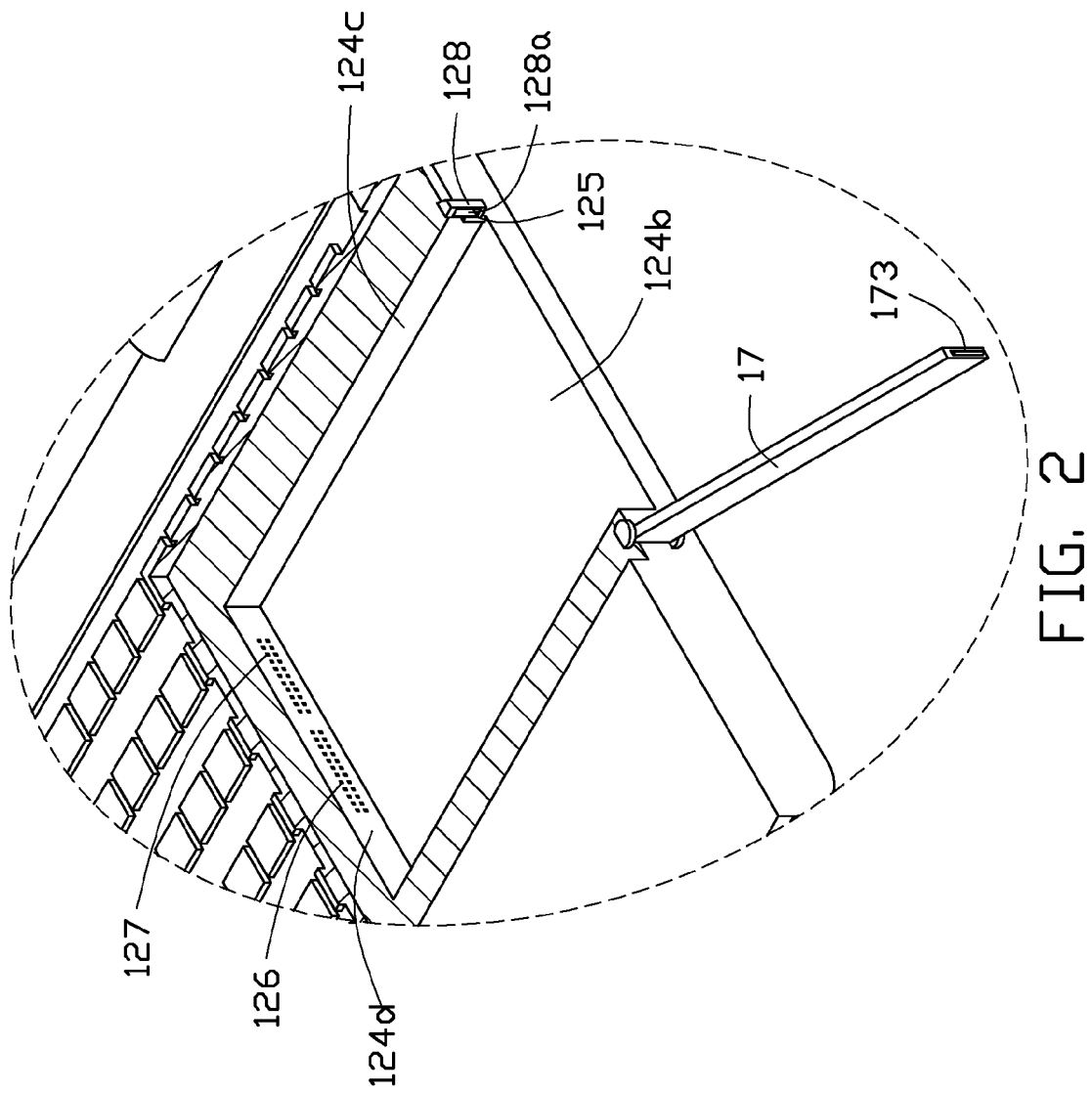
FIG. 2 is an enlarged, isometric view of a portion II of FIG. 1.

Referring to FIGS. 1 and 2, a notebook computer 1, according to an exemplary embodiment, includes a display 10, a main body 12, a support rack 14, an adapter 15, a fastening piece 16, a cover 17, a flexible circuit strip 18, and an auxiliary keyboard 19.

The display 10 is a rectangular display screen for displaying the information, for example, a liquid crystal display. The display 10 pivotally connects to the main body 12. The main body 12 is substantially rectangular and includes a first upper surface 120, a first side surface 122, a primary keyboard 120a, a data port 126, a power port 127, a fixing projection 125, and a lock block 128. The first side surface 122 perpendicularly connects the first upper surface 120. The primary keyboard 120a is formed on the first upper surface 120 and includes a number of main numeric keys and a number of function keys. The main numeric keys of the primary keyboard 120a are arranged in a line along the length of the main body 12.

The main body 12 defines a receiving groove 124 in the first side surface 122. The receiving groove 124 is substantially rectangular and defines an opening 124a, a bottom surface 124b, a pair of parallel inner side surfaces 124c, and an inner end surface 124d. The inner side surfaces 124d perpendicularly connect the bottom surface 124b. The inner end surface 124d is substantially opposite to the opening 124a and perpendicularly connects to the bottom surface 124b and the inner side surfaces 124c. The fixing projection 125 perpendicularly extends from one of the inner side surfaces 124c near the opening 124a. The data port 126 is formed in the inner end surface 124d to transmit the data signal with the auxiliary keyboard 19. The power port 127 is formed in the inner end surface 124d to supply the power signal to the auxiliary keyboard 19. The lock block 128 perpendicularly extends outwards from the first side surface 122 adjacent to the fixing projection 125. The lock block 128 defines a lock groove 128a therein.

Figure 3:
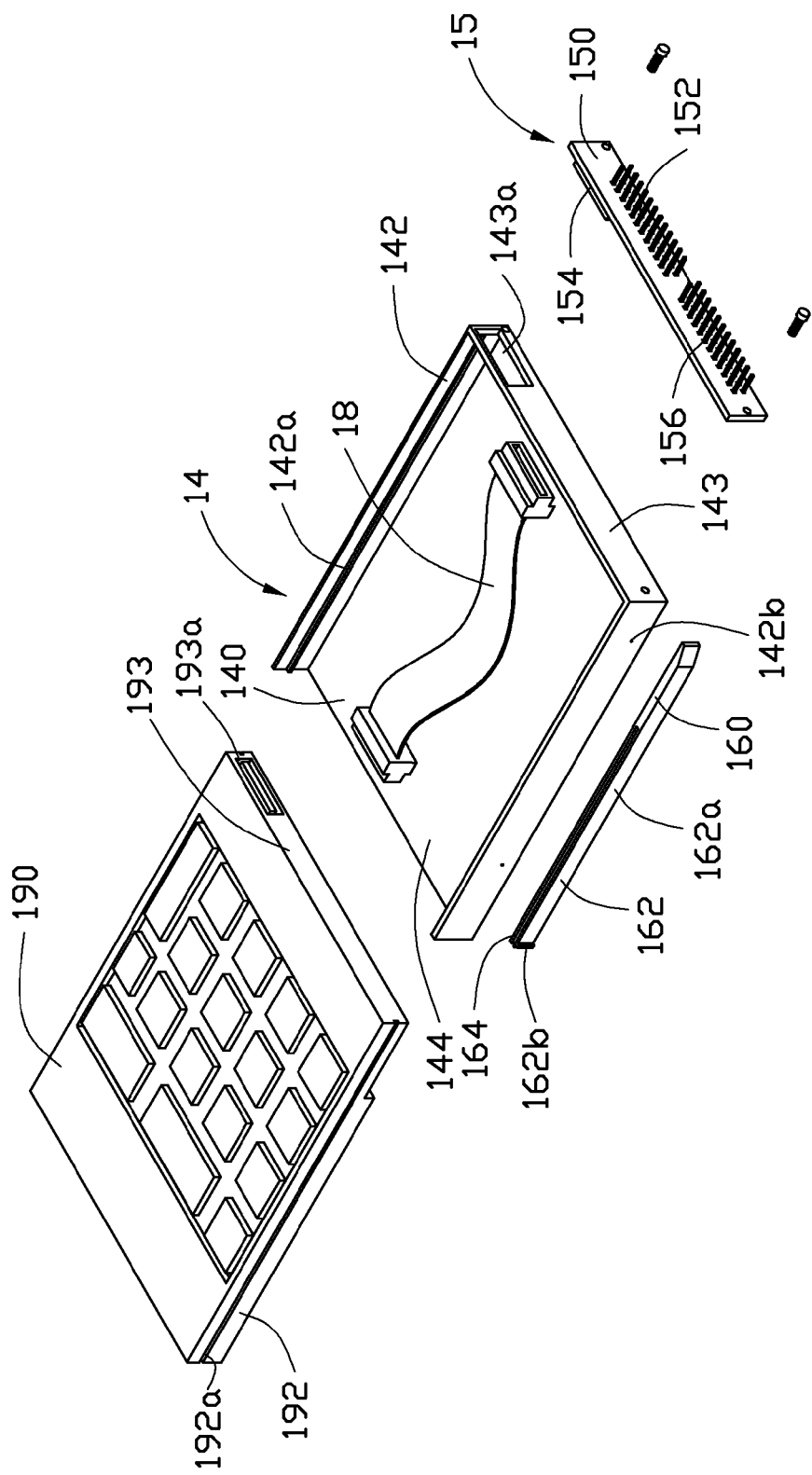
FIG. 3 is an exploded, isometric view of a support rack, a fastening piece, an adapter, and an auxiliary keyboard of the notebook computer of FIG. 1.
Figure 4:
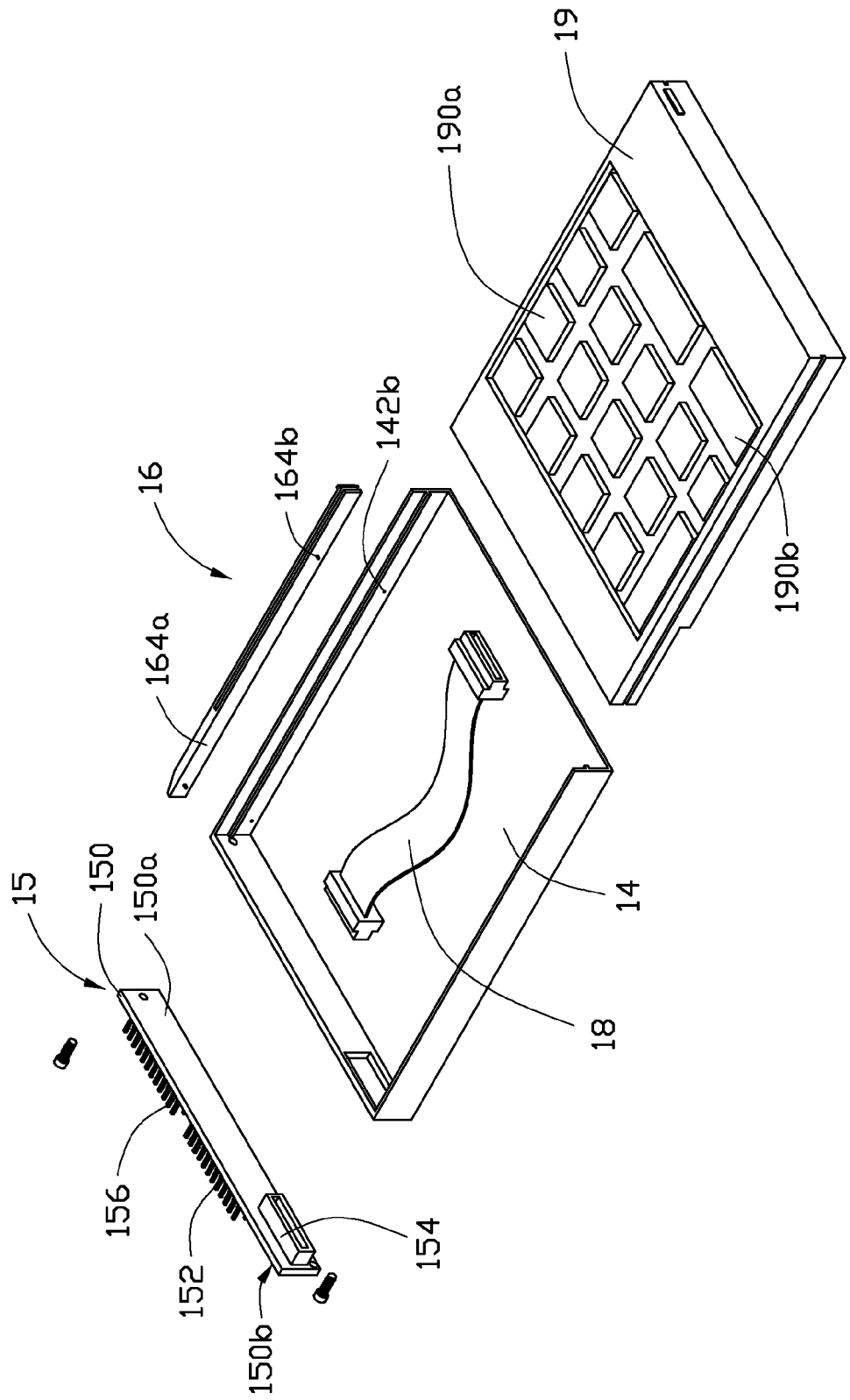
FIG. 4 is an exploded, isometric view of the support rack, the fastening piece, the adapter, and the auxiliary keyboard of FIG. 3, viewed at a different angle.

Also referring to FIGS. 3 and 4, the support rack 14 is substantially rectangular and includes a bottom wall 140, a pair of parallel side walls 142, a rear wall 143, and a pair of sliding rails 142a. The side walls 142 are perpendicularly extended from opposite sides of the bottom wall 140. The rear wall 143 perpendicularly connects the bottom wall 140 and the side walls 142. The bottom wall 140, the side walls 142, and the rear wall 143 cooperatively define an open housing 144. The sliding rails 142a perpendicularly protrude from the inner side of each side wall 142 inwardly towards the open housing 144. Each sliding rail 142a extends along the side wall 142 in a longitudinal direction of the side wall 142 parallel to the bottom surface 140. The support rack 14 defines a connecting through hole 143a in the rear wall 143 near one of the side walls 142. The support rack 14 defines a pair of fixing through holes 142b in the opposite side wall 142 away from the connecting through hole 143a.

The adapter 15 includes a circuit board 150, a data interface 152, a power interface 156, and a first combined interface 154. The circuit board 150 is substantially rectangular and similar to the rear wall 143 in shape and size. The circuit board 150 includes a first connecting surface 150a and a second connecting surface 150b. The first connecting surface 150a is parallel and opposite to the second connecting surface 150b. The data interface 152 is configured for connecting to the data port 126 and forms on the first connecting surface 150a. The power interface 156 is configured for connecting to the power port 127 and forms on the first connecting surface 150a near the data interface 152. The first combined interface 154 is formed on the second connecting surface 150b. The circuit board 150 combines the data signal from the data interface 152 with the power signal from the power interface 156 and transmits the data signal and the power signal to the auxiliary keyboard 19 through the first combined interface 154.

The fastening piece 16 is an elongated flexible strip and includes a main body 160, a first resilient arm 162, a second resilient arm 164, a fastening projection 162b, and a pair of fixing posts 164b. The first resilient arm 162 is parallel to the second resilient arm 164. The first resilient arm 162 and the second resilient arm 164 extend from one end of the main body 160 along the longitudinal direction of the main body 160. The first resilient arm 162 includes a first outer surface 162a opposite to the second resilient arm 164. The fastening projection 162b perpendicularly extends outwardly from the first outer surface 162a at a distal end of the first resilient arm 162 away from the main body 160. The second resilient arm 164 includes a second outer surface 164a opposite to the first resilient arm 162. The fixing posts 164b are formed on the second outer surface 164a facing to the fixing through holes 142b. The fastening piece 16 is made of elastic material, such as rubber or synthetic resin. The first resilient arm 162 and the second resilient arm 164 can be bent from the main body 160.

The cover 17 is an elongated flat board and includes a connecting end 172, a lock end 170, and a lock projection 173. The lock end 170 is opposite to the connecting end 172. The lock projection 173 extends from the lock end 170 along the longitudinal direction of the cover 17.

The auxiliary keyboard 19 is substantially rectangular and includes a second upper surface 190, a pair of parallel second side surfaces 192, a connecting end surface 193, a second combined interface 193a, and a number of auxiliary numeric keys 190a. The second side surfaces 192 perpendicularly connect two opposite sides of the second upper surface 190. The connecting end surface 193 perpendicularly connects the second upper surface 190 and the second side surfaces 192.

The auxiliary numeric keys 190a are formed on the second upper surface 190 and arranged in rows and columns. The auxiliary keyboard 19 defines a sliding groove 192a on each second side surface 192 corresponding to the sliding rails 142a. The second combined interface 193a is formed on the connecting end surface 193. The flexible circuit strip 18 is configured for connecting between the first combined interface 154 and the second combined interface 193a.

Figure 5:
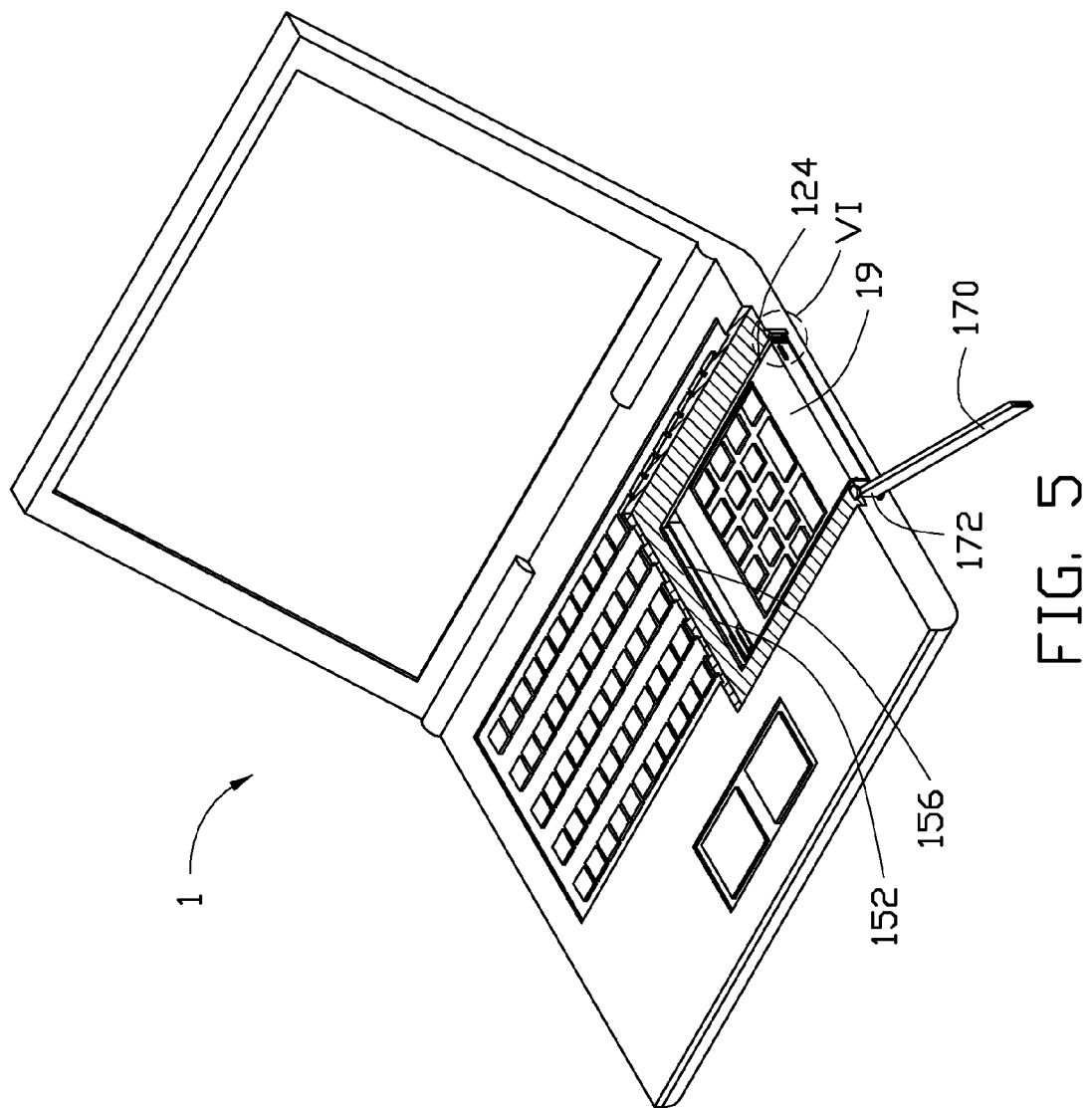
FIG. 5 is an assembled, cutaway and isometric view of the notebook computer of FIG. 1.
Figure 6:
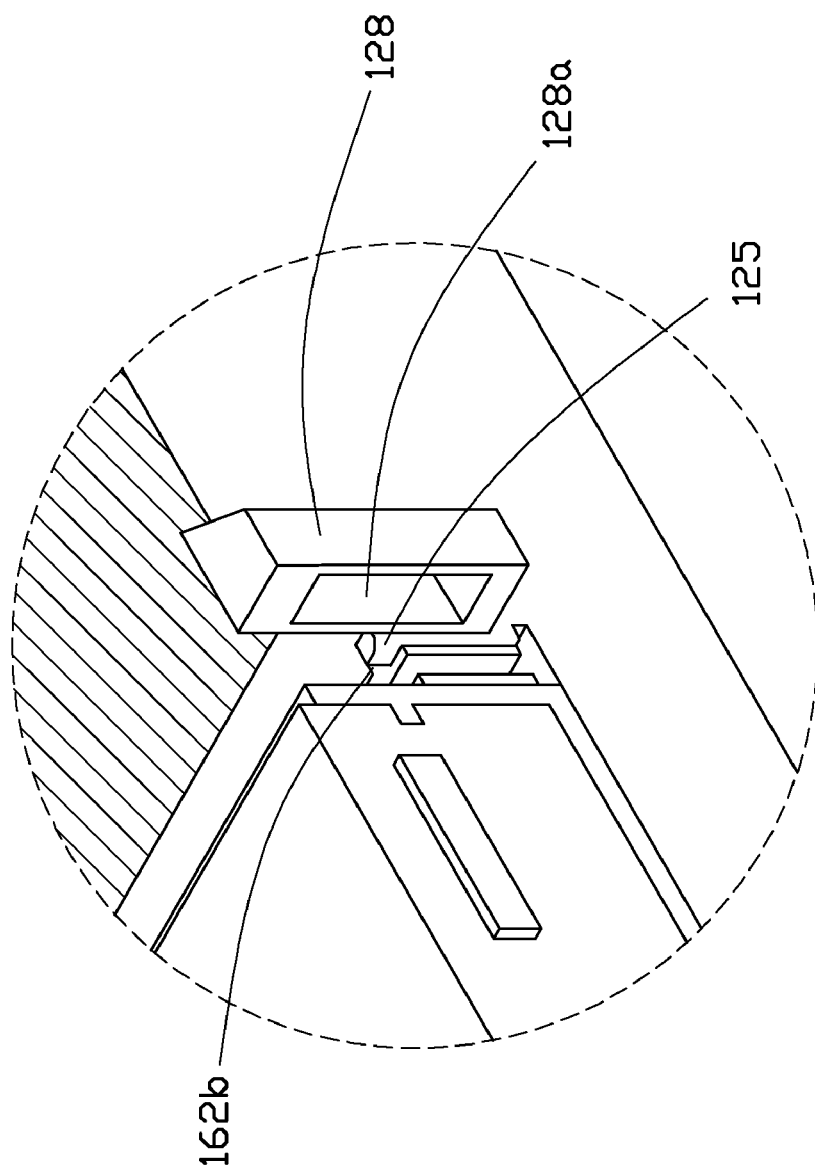
FIG. 6 is an enlarged, isometric view of a portion VI of FIG. 5.

Also referring to FIGS. 5 and 6, in assembly, the connecting end surface 193 faces the rear wall 143, the auxiliary keyboard 19 slides into the open housing 144 of the support rack 14 through the engagement between the sliding grooves 192a and the sliding rails 142a. The second combined interface 193a aligns with the connecting through hole 143a. The first combined interface 154 passes through the connecting through hole 143a and connects the second combined interface 193a through the flexible circuit strip 18. The circuit board 150 is fastened to the rear wall 143 through a pair of bolts. The fixing posts 164b tightly insert into the fixing through holes 142b to fasten the fastening piece 16 on the side wall 142 far from the connecting through hole 143a.

The rear wall 143 faces the inner end surface 124d. The fastening piece 16 fastened on the support rack 14 aligns with the fixing projection 125 formed on the inner side surface 124c. The first resilient arm 162 is bent to the second resilient arm 164 to make the support rack 14 slide into the receiving groove 124 until the fastening projection 162b moves to the position between the inner end surface 124d and the fixing projection 125. Then, the first resilient arm 142 resile to make the fastening projection 162b resist against the fixing projection 125 and prevent the support rack 14 from dropping out of the receiving groove 124. The data interface 152 and the power interface 156 correspondingly connect the data port 126 and the power port 127 to transmit the data and the power between the main body 12 and the auxiliary keyboard 19.

The connecting end 170 of the cover 17 pivotally connects on the first side surface 122 near the inner side surface 124c facing the fixing projection 125. The cover 17 covers the opening 124a by inserting the lock projection 173 into the corresponding lock groove 128a to prevent the auxiliary keyboard 19 from dropping out of the support rack 14.

Figure 7:
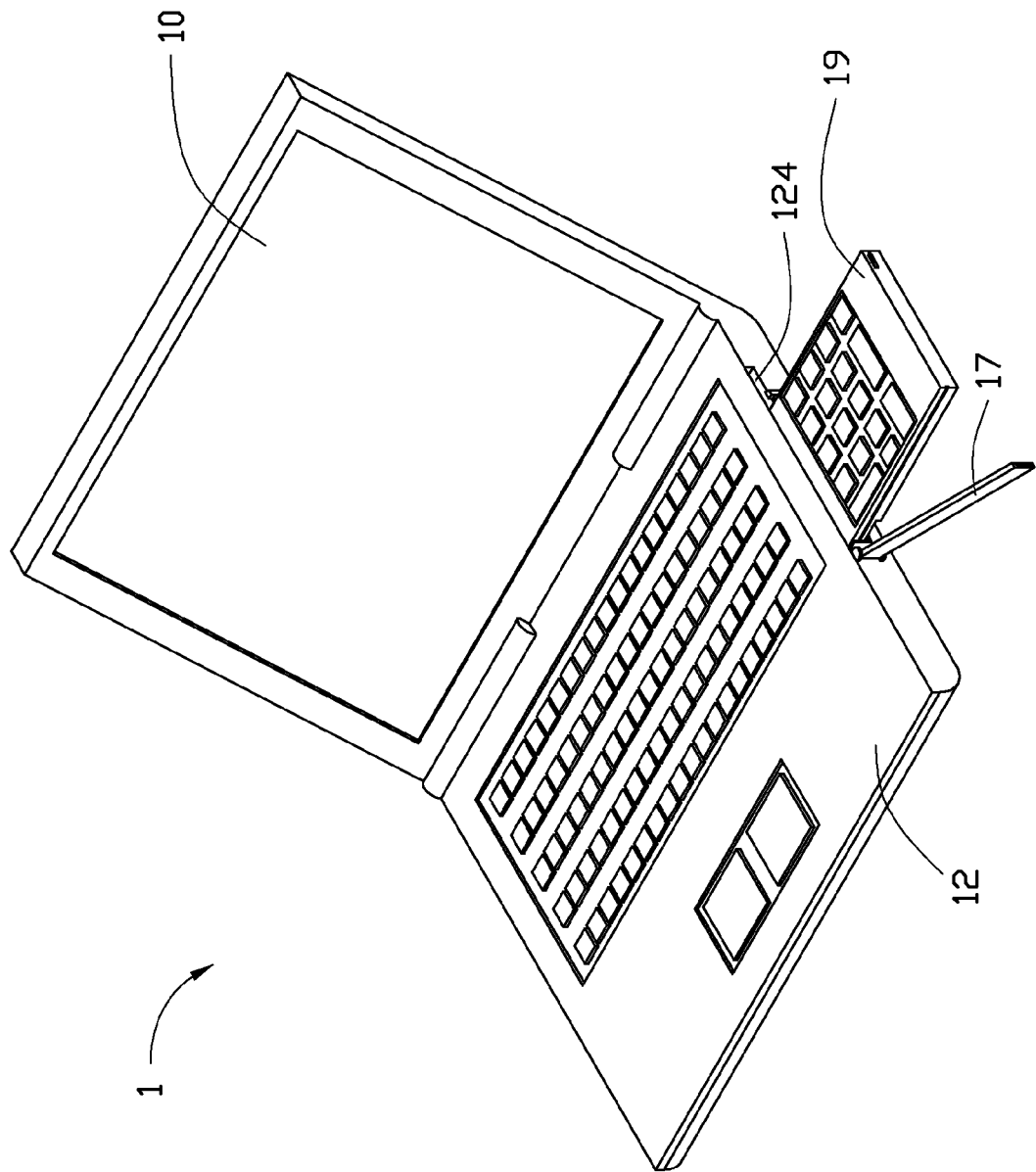
FIG. 7 is an isometric view of the notebook computer of FIG. 1 when the auxiliary keyboard is in use.
Figure 8:
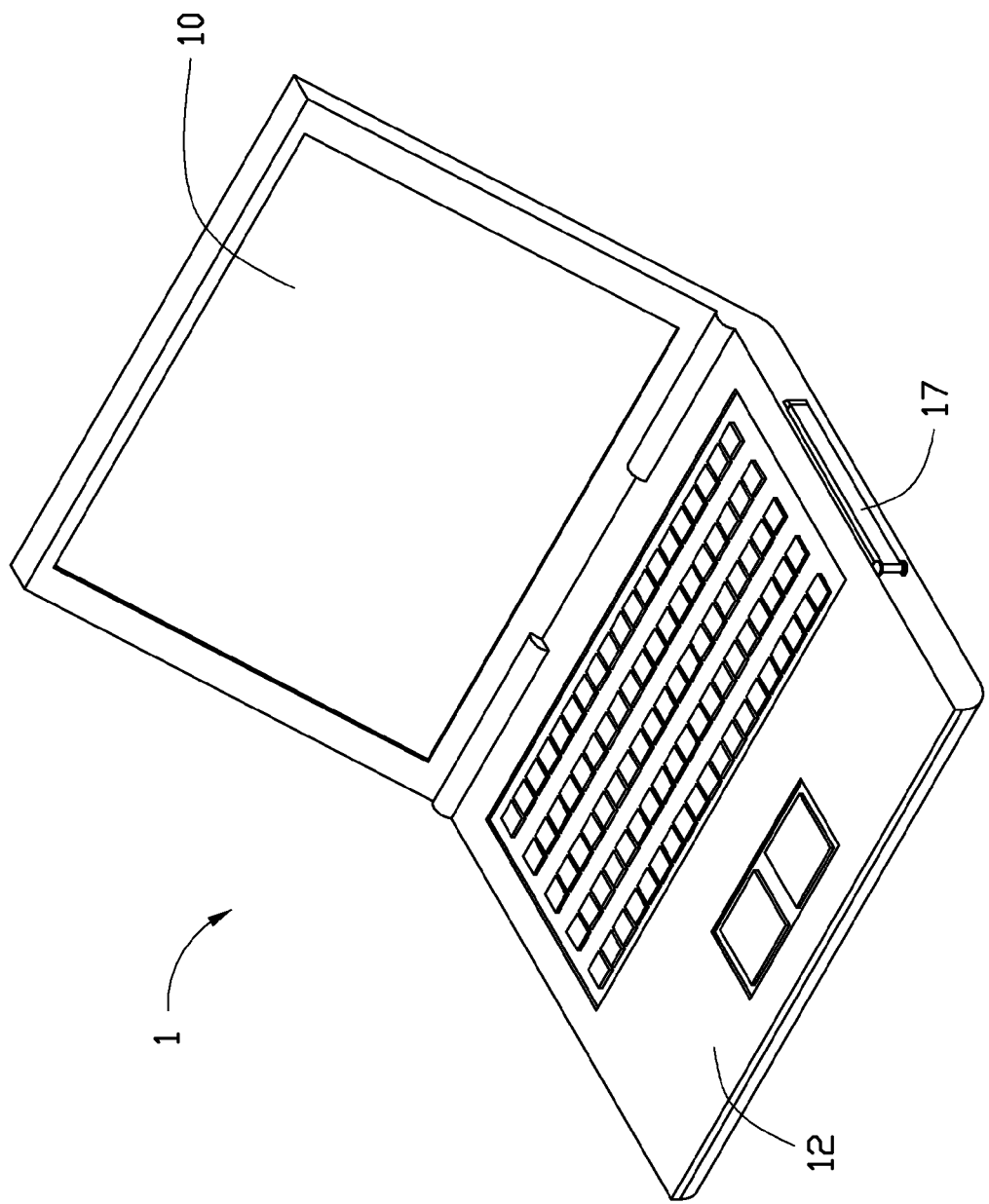
FIG. 8 is an isometric view of the notebook computer of FIG. 1 when the auxiliary keyboard is in storage.

Also referring to FIGS. 7 and 8, when the auxiliary keyboard 19 is in use, the cover 17 is opened and the auxiliary keyboard 19 is pulled out of the receiving groove 124. The auxiliary keyboard 19 allows the numbers to be easily inputted, because the auxiliary numeric keys 190a are arranged in rows and columns. When the auxiliary keyboard 19 is in rest, the auxiliary keyboard 19 can be accommodated in the receiving groove 124 to reduce the size of the notebook 1.

While various exemplary and preferred embodiments have been described, it is to be understood that the disclosure is not limited thereto. To the contrary, various modifications and similar arrangements (as would be apparent to those skilled in the art) are intended to also be covered. Therefore, the scope of the appended claims should be accorded the broadest interpretation so as to encompass all such modifications and similar arrangements.

What is claimed is:

1. A notebook computer comprising:
a main body defining a receiving groove, wherein the receiving groove defines a bottom surface, a pair of parallel inner side surfaces perpendicularly connected to the bottom surface, an inner end surface perpendicularly connected to the bottom surface and the inner side surfaces, and an opening substantially opposite to the inner end surface;
an auxiliary keyboard slidably accommodated in the receiving groove and electrically connected to the main body, the auxiliary keyboard capable of being slid out of the receiving groove in use and received in the receiving groove in storage; and
a cover configured for pivotally covering the groove when the auxiliary keyboard is in storage;
wherein the main body further comprises a data port formed on the inner end surface to transmit data with the auxiliary keyboard and a power port formed on the inner end surface to supply power to the auxiliary keyboard.

2. The notebook computer as claimed in claim 1, wherein the auxiliary keyboard comprising a number of auxiliary numeric keys arranged in rows and columns.

3. The notebook computer as claimed in claim 1, wherein the main body is substantially rectangular and comprises a first upper surface, a first side surface, and a primary keyboard, the first side surface perpendicularly connects the first upper surface, and the receiving groove is defined in the first side surface.

4. The notebook computer as claimed in claim 1, wherein the main body further comprises a fixing projection configured for fixing the auxiliary keyboard in the receiving groove, and the fixing projection perpendicularly extends from one of the inner side surfaces near the opening.

5. The notebook computer as claimed in claim 4, wherein the main body further comprises a lock block, the lock block perpendicularly extends outwards from the first side surface adjacent to the fixing projection, and the lock block defines a lock groove therein.

6. The notebook computer as claimed in claim 4, wherein the cover is an elongated flat board and comprises a connecting end, a lock end, and a lock projection, the lock end is opposite to the connecting end, the lock projection extends from the lock end along the longitudinal direction of the cover, the connecting end pivotally connects on the first side surface near the inner side surface facing the fixing projection, and the cover covers the opening by inserting the lock projection into the corresponding lock groove.

7. The notebook computer as claimed in claim 1, wherein the notebook computer further comprises a support rack fixed into the receiving groove, the support rack is substantially rectangular and comprises a bottom wall, a pair of parallel side walls perpendicularly connecting the bottom wall, and a rear wall perpendicularly connecting the bottom wall and the side walls, and the support rack defines a connecting through hole in the rear wall near one of the side walls and a pair of fixing through holes in the other side wall far from the connecting through hole.

8. The notebook computer as claimed in claim 7, further comprising a fastening piece, wherein the fastening piece comprises a main body, a first resilient arm, a second resilient arm, a fastening projection, and a pair of fixing posts, and the first resilient arm and the second resilient arm parallelly extend from one end of the main body along the longitudinal direction of the main body.

9. The notebook computer as claimed in claim 8, wherein the first resilient arm comprises a first outer surface opposite to the second resilient arm, the fastening projection perpendicularly extends outwards from the first outer surface and far from the main body, and the fastening projection resists against the fixing projection when the support rack is fixed into the receiving groove.

10. The notebook computer as claimed in claim 9, wherein the second resilient arm comprises a second outer surface opposite to the first resilient arm, the fixing posts are formed on the second outer surface and correspond to the fixing through holes, and the fixing posts tightly insert into the fixing through holes to fasten the fastening piece on the side wall.

11. The notebook computer as claimed in claim 8, wherein the fastening piece is made of elastic material, and the first resilient arm and the second resilient arm can be bent from the main body.

12. The notebook computer as claim claimed in claim 7, wherein the support rack comprises a pair of sliding rails perpendicularly protruding from the inner side of each side wall along the longitudinal direction of the side wall, and the sliding rails are parallel to the bottom surface.

13. The notebook computer as claimed in claim 12, wherein the auxiliary keyboard is substantially rectangular and comprises a second upper surface, a pair of parallel second side surfaces perpendicularly connecting the second upper surface, and a connecting end surface perpendicularly connecting the second upper surface and the second side surfaces.

14. The notebook computer as claimed in claim 13, wherein the auxiliary keyboard defines a sliding groove on each second side surface corresponding to the sliding rails, the connecting end surface faces the rear wall, and the auxiliary keyboard slides into the support rack through the engagement between the sliding grooves and the sliding rails.

15. The notebook computer as claimed in claim 13, further comprising an adapter, wherein the adapter comprises a circuit board comprising a first connecting surface and a second connecting surface opposite to the first connecting surface, a data interface is formed on the first connecting surface, a power interface is formed on the first connecting surface near the data interface, and a first combined interface is formed on the second connecting surface.

16. The notebook computer as claimed in claim 15, further comprising a flexible circuit strip, wherein the auxiliary keyboard comprises a second combined interface formed on the connecting end surface, the first combined interface passes through the connecting through hole and connects the second combined interface through the flexible circuit strip, and the circuit board is fastened to the rear wall.

17. A notebook computer comprising:
a main body defining a receiving groove;
a support rack fixed into the receiving groove;
an auxiliary keyboard slidably accommodated in the support rack and electrically connected to the main body, the auxiliary keyboard capable of being slid out of the support rack in use and received in the support rack in storage; and
a cover configured for pivotally covering the groove when the auxiliary keyboard is in storage.

18. The notebook computer as claimed in claim 17, wherein the support rack comprises a bottom wall, a pair of parallel side walls perpendicularly connecting the bottom wall, and a rear wall perpendicularly connecting the bottom wall and the side walls, and the support rack defines a connecting through hole in the rear wall near one of the side walls and a pair of fixing through holes in the other side wall far from the connecting through hole.

19. The notebook computer as claimed in claim 18, further comprising a fastening piece, wherein the fastening piece comprises a main body, a first resilient arm, a second resilient arm, a fastening projection, and a pair of fixing posts, the first resilient arm and the second resilient arm parallelly extend from one end of the main body along the longitudinal direction of the main body, and the fixing posts tightly insert into the corresponding fixing through holes to fasten the fastening piece on the side wall.

20. The notebook computer as claimed in claim 18, wherein the receiving groove defines a bottom surface, a pair of parallel inner side surfaces perpendicularly connected to the bottom surface, an inner end surface perpendicularly connected to the bottom surface and the inner side surfaces, and an opening opposite to the inner end surface, the main body comprises a data port formed on the inner end surface to transmit data with the auxiliary keyboard and a power portion formed on the inner end surface to supply power to the auxiliary keyboard, and the auxiliary keyboard connects the data port and the power port via the connecting through hole.

\* \* \* \* \*